Figure 5:
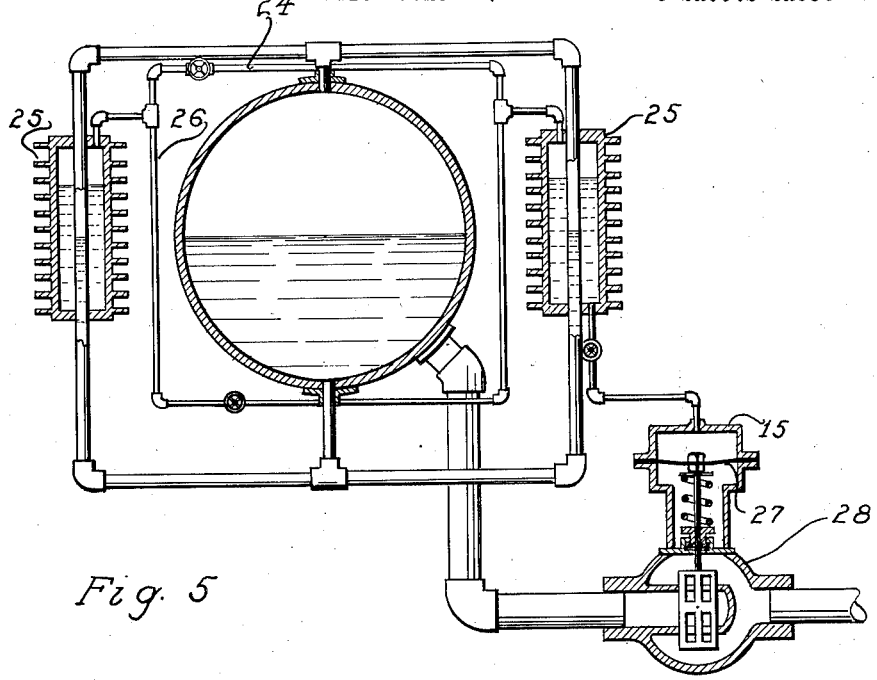

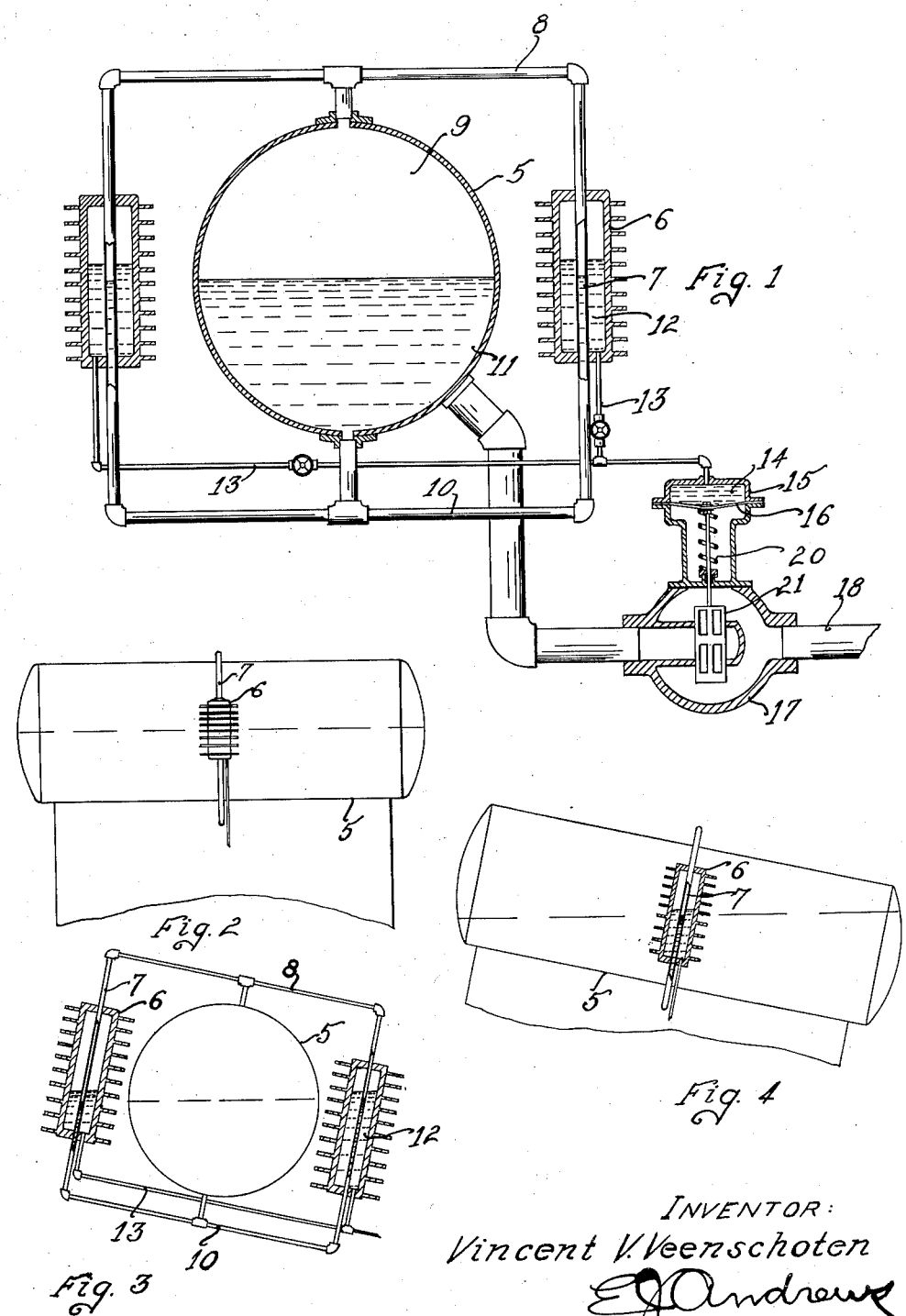

INVENTOR.
Vincent V. Veenschoten
BY
ATTORNEY.

Patented Nov. 6, 1934

1,979,299

UNITED STATES PATENT OFFICE 1,979,299

FEED WATER REGULATOR

Vincent V. Veenschoten, Erie, Pa., assignor to Northern Equipment Company, Erie, Pa., a corporation of Pennsylvania Application June 18, 1932, Serial No. 617,963

10 Claims. (Cl. 122—451)

This invention relates to feed water regulators for boilers and particularly to boilers which are installed in ships. As is well understood, it is desirable to provide automatic feed water regulators for boilers, in order to maintain within certain limits the level of the water in the boiler and, as the rocking of ships ordinarily disturbs materially the level of the water installed in the ships, the ordinary type of automatic feed water regulators is not very satisfactory. Hence, the purpose of this invention is to provide a regulator system that will not be materially affected by the listing or pitching of the ship, and the consequent variation of the water level in the boilers.

Of the accompanying drawings, Fig. 1 is a vertical sectional elevation of a feed water regulator system which embodies the features of my invention; Fig. 2 is a reduced elevation of the system at 90° to that of Fig. 1; Fig. 3 is a reduced end view of the boiler and system, indicating the position of the liquid levels in the various devices when the ship is listed sidewise; Fig. 4 is a corresponding view at 90° to that of Fig. 3, showing the effect on the system of the pitching of the ship; and Figs. 5, 6, 7 and 8 are vertical elevations of modified systems, embodying some features of my invention.

To illustrate my invention, I have preferred to use a particular type of feed water regulator, the so-called generator type. But it is to be understood that other types of regulators could be used for the purpose, the general principles involved in the application to boilers of ships being carried out as herein illustrated. The general principle is to install two regulators, one on each side of the boiler and midway between the two ends of the boiler. As is well understood, these regulators are so installed that the water stands in the regulators at all times at substantially the same elevation as in the boiler. As a consequence, when the ship lists, the water will rise in the sinking regulator and sink in the rising regulator, and the average level of the water in the two regulators will remain substantially uniform and substantially the same as the normal level of the water in the boiler.

In carrying out the invention, the regulators are applied to a boiler 5, and each regulator comprises a generator casing 6 through which passes, in an ordinary manner, a pipe 7 which leads, by a pipe 8, to the steam space 9, of the boiler, and, by a pipe 10, to the water space 11 of the boiler. The regulators are installed so that the central portion is substantially at the same elevation as the normal water level in the boiler. As a consequence of the manner of connection the water level in the pipes 7 will stand at substantially the same elevation as the water in the boiler, and hence, normally, the level in the pipes will be near the central portions of the generators. The portions of the pipes 7 above the water level therein will be full of steam.

As is usual, the generators 6 contain a liquid 12 of low volatility, and the chamber of the generator is connected by a pipe 13 with the diaphragm chamber 14 in a casing 15. As a consequence of this arrangement, when the water in the boiler and also in the generators sinks, the steam will heat a greater portion of the pipes 7 in the generators, and more of the liquid 12 will be evaporated, so that the increased pressure in the generators will force downwardly the diaphragm 16 and open more the feed water valve 17. This will allow more water to flow through the supply pipe 18 to the boiler, thus elevating the level of the water therein.

Obviously, as the water in the boiler rises, the reverse process will occur, the portion of the pipe 7 in the generators will be cooled more, the pressure therein will be reduced, and the spring 20 will then force the plunger 21 upwardly and close more the valve.

As will be readily understood the two regulators act together to control the position of the plunger 21, so that this double arrangement makes the apparatus twice as sensitive as if one regulator only were used, and, in this way, the system is more effective in controlling the position of the plunger 21 exactly in accordance with the needs of the boiler. Also, when the ship lists, the system will take the position indicated in Fig. 3. As a consequence the water will rise in the right hand generator pipe and sink in the left hand pipe. Also, there will be a drift of the volatile liquid 12 towards the right hand generator and away from the left hand generator. As a consequence, the left hand regulator will receive more heat, and its pressure will increase, while, at the same time, the right hand regulator will receive less heat, and its pressure will decrease a substantially corresponding amount. As a consequence of this, the increased pressure in the left hand regulator will merely offset the decreased pressure in the right hand regulator and there will be no material variation in pressure in the diaphragm chamber 14.

When the boat pitches, the system will take the position indicated by Fig. 4 but, as indicated, the water levels in the generators 6 will not materially vary in heights, as the generators are positioned midway between the two ends of the boiler and, hence, the water level in the pipes 7 will remain substantially unchanged when the boiler is tipped, as indicated.

The modification of Fig. 5 shows an arrangement by which the drifting of the volatile liquid from one generator to the other when the ship lists is largely eliminated. This is accomplished by connecting the upper ends of the generators 25 by pipes 24 and 26 and without connecting the lower ends of the generators. Either pipe can be closed by a valve 23, and the other pipe alone be used. As a consequence of this arrangement, while the vapor pressures are free to be effective as before, yet there can be no flow of the volatile liquid from one generator to another, except as there might be a slight flow from the condensation in the pipe in use. By having the pipe 26 bent downward, as indicated, it is maintained at all times substantially full of liquid and, hence, there is no material condensation of vapor in the pipe, as would be the case if it were not bent downwardly. If the pipe 24 alone is used, the amount of condensation would be greater, but the drift of liquid would be slight.

In this case, it is necessary to connect one of the generators only to the diaphragm casing 15. In this manner, both generators are effective in operating the valve, as the vapor pressure is substantially uniform in the two generators, and the connection of the lower ends is avoided. As the ship lists, one generator will sink and the other will rise, and the effect of each generator will be neutralized by the effect of the other as the vapor pressure will increase in the generator that is elevated and decrease in the generator that is lowered and, as a consequence, the aggregate pressure will remain substantially the same, and there will be no material effect on the diaphragm 27 and on the opening of the feed water valve 28.

Figure 6:
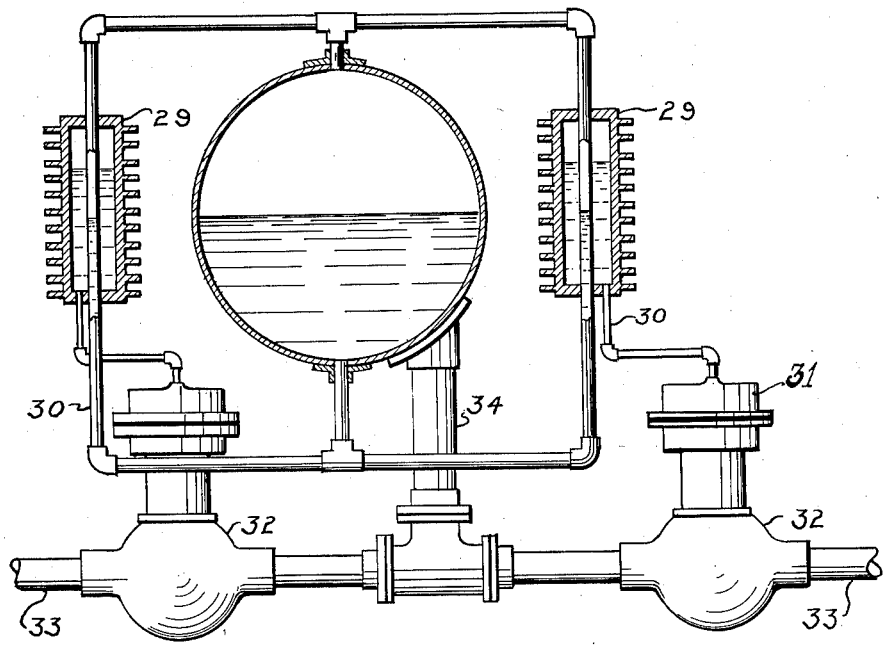

A further modification is shown in Fig. 6. In this case, the generators are not connected at all, but the lower end of each generator is connected by a pipe 30 to a diaphragm casing 31, and each diaphragm casing is arranged to operate a valve 32 mounted in a supply pipe 33. In this case, each supply pipe 33 is supplied with water under suitable pressure and delivers the feed water through the valve 32 to the common pipe 34 and, thus, to the boiler. It will be seen that, in this case, the effect of one of the generators 29 in case of the listing of the ship will substantially offset the effect of the other generator; as in case of the generator which is elevated, the associated valve 32 will be opened more and the other valve associated with the generator which is lowered will be closed more, so that, if properly adjusted, the flow of water to the boiler will remain substantially the same.

Figure 7:
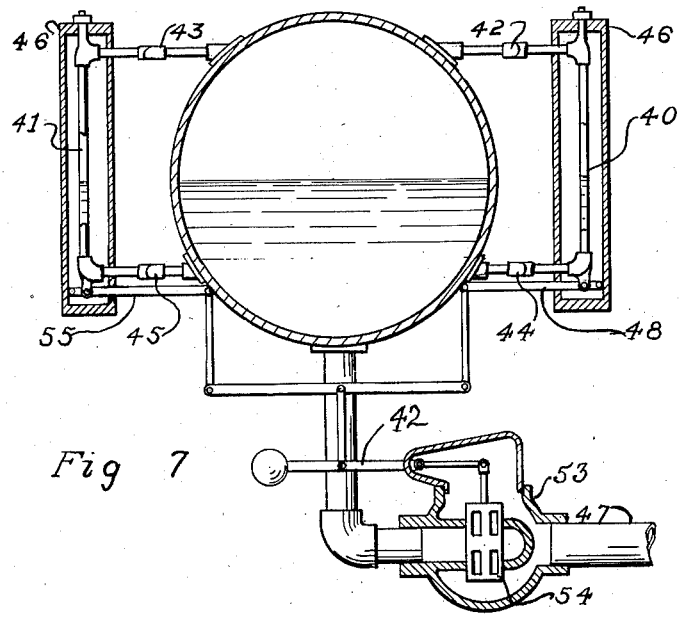

A further modification is shown in Fig. 7, in which thermostatic tubes 40 and 41 replace the generators. These tubes are connected at their upper ends by means of pipes 42 and 43 to the steam space of the boiler, and by their lower ends by means of pipes 44 and 45 to the water space of the boiler, so that the water stands in the tubes at all times at substantially the same elevation as in the boiler. In case of listing of the ship, the water will rise in one tube and sink in the other substantially the same amount.

The upper end of each tube is fixed to a suitable frame 46, and the lower ends, which are free to move as the tubes contract and expand, are connected by means of a system of levers to the feed water valve 47.

In operation, as the water in the tube 40 rises, a greater portion of the tube will be cooled, and the tube will contract and elevate the arms 48 and 42, thus lowering the plunger 54 and closing more the valve 53 in the feed water pipe 47. If the water in the tube 40 sinks, the reverse operation will occur. In case the water level in the tube 41 rises, this tube will contract and the arm 55 will be forced upwardly. Thus, the arm 42 will be elevated and the valve 53 closed more. In this manner, each tube will have its independent effect on the position of the plunger 54 of the valve. As each tube acts on the valve, the system is more sensitive than with a single tube, and the leverage of each may be less than if a single tube were used.

If the ship lists, the water in one tube will sink, and in the other tube will rise, and the effect of each tube will be substantially neutralized by the other, and no material change in the position of the valve plunger will result.

Figure 8:
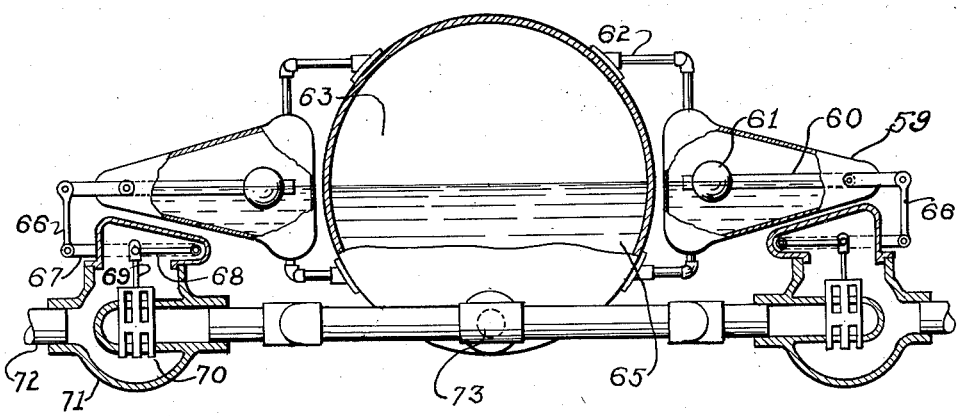

The modification shown in Fig. 8 comprises a pair of float regulators. Each of these regulators consists in a casing 59 in which is mounted a float 61 on a lever 60. The upper portion of each of the casings is connected, by means of a pipe 62, to the steam space 63 of the boiler, and the lower portion of each casing is connected by a pipe 64 to the water space 65 of the boiler. Each of the regulators is connected in a common manner, by means of a link 66, an arm 67, and an arm 68, to the stem 69 of the plunger 70 of the feed water valve 71. As is well understood, the water in each float chamber of the casing 59 will stand at substantially the same elevation as the water in the boiler. As the water in either chamber rises, the float will rise and, by means of the connecting mechanism, will tend to close more the feed water valve.

In case of the listing of the boat, the effect of one float regulator will be neutralized by the effect of the other, as in the case of Fig. 6, as the rising regulator will open more its associated valve 71, and the sinking regulator will open more its valve. Each of these valves is mounted in a feed water supply pipe 72 and is arranged to pass water through a common pipe 73 to the boiler. It is to be understood that in case of the modifications of Figs. 7 and 8, the generator or the float casings are positioned midway of the ends of the boilers, so that the pitching of the ship, or the tipping of the boiler endwise in any manner, will not materially vary the elevation of the water in the casings, just as has been described with reference to the other modifications.

I claim as my invention:
1. A boiler in combination with feed water mechanism therefor, said mechanism comprising feed water valve, a regulator for said valve mounted on each side of the boiler and midway of the ends of the boiler, each regulator being operatively in communication with the steam space and the water space of the boiler and being operatively associated with the valve.

2. Feed water mechanism as claimed in claim 1, in which each regualtor comprises a vessel having a water chamber therein, means providing communication between the upper portion of the chamber with the steam space of the boiler and the lower portion with the water space of the boiler, whereby the level of the water in the chambers stands at substantially the same elevation as in the boiler, and means responsive to variations in water level in said chambers operatively associating the vessels with said valve.

3. A boiler system in combination with feed water mechanism as claimed in claim 1, in which each regulator comprises a liquid container having a chamber therein, a pipe connecting the two chambers, a water container mounted in each chamber, a pipe connecting each water container with the central portion of the steam space and also with the central portion of the water space of the boiler, hydraulic means for operating said valve, and a pipe connecting said first mentioned pipe with said means.

4. A boiler system in combination with feed water mechanism as claimed in claim 1 in which each regulator comprises a casing having a chamber therein, hydraulic means for operating said valve, a pipe connecting each of said chambers with said means, a pipe passing through each of said chambers, the upper end of each of said latter pipes being connected with the steam space of said boiler, and the lower end of each of said latter pipes being connected with the water space of the said boiler.

5. A boiler system in combination with feed water mechanisms as claimed in claim 1, in which each regulator comprises a vessel having a water chamber therein, means providing communication between the upper portion of each chamber with the steam space of the boiler and the lower portion thereof with the water space of the boiler, whereby the level of the water in the chambers stands at substantially the same elevation as in the boiler, and hydraulic means responsive to variations in water levels in said chambers operatively associating each vessel with said valve.

6. A boiler system in combination with feed water mechanism as claimed in claim 1, in which each regulator comprises a vessel having a water chamber therein, and means providing communication between the upper portion of each chamber with the steam space of the boiler and the lower portion thereof with the water space of the boiler, whereby the level of the water in the chambers stands at substantially the same elevation as in the boiler, said vessels comprising thermostatic means responsive to variations in water levels in said vessels and operatively associated with said valve.

7. A boiler system in combination with feed water mechanism as claimed in claim 10, in which each regulator comprises a vessel having a water chamber therein, means providing communication between the upper portion of each chamber with the steam space of the boiler and the lower portion thereof with the water space of the boiler, whereby the level of the water in the chambers stands at substantially the same elevation as in the boiler, and float means responsive to variations in water level in said vessels operatively associated with said means for passing water to the boiler.

8. A boiler system in combination with feed water mechanism as claimed in claim 1, in which each regulator comprises a liquid container having a chamber therein, a pipe connecting the lower portion or the two chambers, a water container mounted in each chamber, a pipe connecting each water container with the steam space and also with the water space of the boiler, hydraulic means for operating said valve, and a pipe connecting said first mentioned pipe with said means.

9. A boiler system in combination with a feed water mechanism as claimed in claim 1, in which each regulator comprises a liquid container having a chamber therein, a pipe connecting the upper portion of the two chambers, a water container mounted in each chamber, a pipe connecting each water container with the steam space and also with the water space of the boiler, hydraulic means for operating said valve, and a pipe connecting one of the chambers with said means.

10. A boiler in combination with feed water mechanism therefor, said mechanism comprising means for passing water to the boiler, a regulator for said means mounted on each side of the boiler and midway of the ends thereof, each regulator being operatively in communication with the central portions of the steam space and the water space of the boiler and being operatively associated with said means.

VINCENT V. VEENSCHOTEN.